United States Patent [19]
Croteau et al.

[11] Patent Number: 5,669,754
[45] Date of Patent: Sep. 23, 1997

[54] METHOD AND APPARATUS FOR COLLECTING PLATES

[75] Inventors: Normand Croteau, Carignan; Fergus M. Groundwater, St. Lambert; Jean Guy Caron, St. Bruno, all of Canada

[73] Assignee: Advanced Dynamics Corporation Ltd., St. Bruno, Canada

[21] Appl. No.: 635,797

[22] Filed: Apr. 22, 1996

[51] Int. Cl.$^6$ .................................................. B65G 57/06
[52] U.S. Cl. .................... 414/786; 29/623.1; 53/542; 198/405; 198/418.5; 198/470.1; 198/631.1; 414/788
[58] Field of Search ................... 29/623.1, 730; 53/155, 542; 198/377, 403, 405, 406, 408, 418.5, 418.3, 470.1, 631.1; 414/788, 788.3, 788.5

[56] References Cited

U.S. PATENT DOCUMENTS

| | | | |
|---|---|---|---|
| 4,307,800 | 12/1981 | Joa | 414/788.3 X |
| 4,315,356 | 2/1982 | Laurie et al. | 29/6.1 |
| 4,407,063 | 10/1983 | Johnson | 29/623.2 |
| 4,778,479 | 10/1988 | Römling et al. | 29/623.1 |
| 4,824,307 | 4/1989 | Johnson et al. | 414/788 X |
| 5,006,040 | 4/1991 | Frey | 29/623.1 X |
| 5,102,287 | 4/1992 | Johnson et al. | 414/618 |
| 5,129,643 | 7/1992 | Johnson et al. | 271/216 |

*Primary Examiner*—Karen B. Merritt
*Assistant Examiner*—Janice L. Krizek
*Attorney, Agent, or Firm*—Arne I. Fors

[57] ABSTRACT

A method and an apparatus for collecting plates from two rows of plates travelling side-by-side on a moving conveyor comprising inverting plates sequentially in one row of plates and merging said two rows of plates by depositing a plate from one row onto a plate in the other row to form a single row of double plates each having an inverted plate, and assembling a single row of said double plates into stacks. The double plates are assembled into stacks preferably by shingling the double plates to assemble a plurality of overlapped double plates, stacking shingled double plates to form horizontal stacks, turning each horizontal stack onto a side or end of the stack to form a vertically-stacked bundle, and rocking the vertically-stacked bundle on the side or end to align the plates on the side or end, rotating the bundle vertically through 90° onto an adjacent end or side, and rocking the bundle on the adjacent end or side to align the plates on the adjacent end or side, whereby the plates form a squared bundle having even sides and ends. In one embodiment the plates are lead alloy battery plate electrodes each having a tab extending from a side edge thereof, the two rows of plates are travelling side-by-side on a first conveyor with the tabs of one row of plates facing the tabs of the other row of plates, the plates in one row of plates are inverted by passing the plates sequentially over an endless belt having an upper moving surface turning from a substantially horizonal plane through about 90° to a substantially vertical plane at a linear speed effective to turn the plates upside down onto a second conveyor, and the two rows of plates are merged by transferring one row of plates onto a diagonal conveyor intersecting the second conveyor and controlling the relative speeds of the second conveyor and diagonal conveyor whereby each plate on one conveyor is deposited on a plate of the other conveyor to form a pair of double plates with the tabs of the two plates at least partially overlapping each other.

8 Claims, 12 Drawing Sheets

METHOD AND APPARATUS FOR COLLECTING PLATES

FIELD OF THE INVENTION

This invention relates to a method and apparatus for collecting plates and, more particularly, relates to a method and apparatus for collecting and assembling metal plates for use as battery plate electrodes, and to novel battery plate assemblies produced thereby.

BACKGROUND OF THE INVENTION

U.S. Pat. No. 4,315,356 issued Feb. 16, 1982 discloses the production of expanded metal mesh from continuously cast metal alloys for use as battery plate electrodes, hereinafter referred to as "plates". A slitting and expanding technique was developed for the continuous production of the metal mesh from lead alloy strip cast by a drum caster. The expanded mesh is produced from a coil of the lead alloy, paste applied to the mesh, and the pasted mesh divided into discrete plates. The plates are conveyed along a pair of parallel conveyor lines for stacking to produce two vertically arranged stacks. Since it is difficult to apply the paste uniformly to the mesh across the width of the mesh, one stack of plates frequently will have a thicker coating of paste than the other stack, thereby causing length differences between the two stacks, or pasting of mesh will not be uniformly parallel thereby causing plates to be wedge shaped creating non-square bundles.

It has been found as a result that vertically arranged stacks of battery plates placed into battery cells of fixed dimensions may be unduly tightly packed or loosely packed depending on the stack from which the plates were taken, and that the stacks may not be square if the plates are wedge-shaped. The tightness of packing of the grid plates can affect the effectiveness of the battery and eventually the length of the battery life.

It is an object of the present invention therefore to provide a method and apparatus for collecting and assembling grid plates into square bundles or vertical stacks having a generally uniform and consistent cross-sectional thickness and length.

Battery plates conventionally are collected by two people at the end of a plate line. The plates are hand manipulated to form bundles which are chemically cured subsequently before assembly into battery cells. Manual handling and collection of lead alloy plates expose workers to environmental health problems due to the presence of lead dust, ergonomic problems such as tendinitis, and may result in quality control problems including product damage from inconsistent handling procedures such as the crimping of plate corners causing internal electrical shorting. In addition, high labour costs result from continuous operation of 3 shifts/day for 6 to 7-day work weeks.

It is another object of the present invention to provide an automated, continuously-operating method and apparatus which require a minimal of manual labour.

The top and side edges and the lugs which protrude from the top edges of plates vertically stacked upon discharge from a continuous conveyor system usually are not centered and aligned with each other and, as a result, it often is difficult to bundle the plates for subsequent processing such as heat treatment and curing, for shipping, or to load the plates into battery cells, without damage to the plate edges and the lugs. U.S. Pat. No. 4,824,307 issued Apr. 25, 1989 discloses an apparatus for aligning battery plates in which battery plates vertically stacked in a plurality of upstanding pockets carried by an endless drive unit are blocked and centered while they travel in the pockets by alignment modules consisting of right-hand fingers and left-hand fingers connected to respective control rods which engage lugs protruding upwardly from the tops of the battery plates.

It is another object of the present invention therefore to provide a simple method and apparatus for centering and aligning the edges of the vertically stacked plates to form squared bundles, thereby facilitating cell assembly which is done by high-speed automated equipment that requires squared bundles to avoid jam-ups that cause machine downtime.

SUMMARY OF THE INVENTION

It has been found that inverting and depositing plates sequentially from one row of plates onto opposed plates of another row of adjacent plates travelling side-by-side on a conveyor system to form a merged, single row of plate pairs, immediately after pasting and cutting of pasted mesh into individual grid plates, not only simplifies the assembly of plates into stacks by obviating one conveyor line but also results in the stacks being of more uniform and consistent thickness. Inversion and stacking of the plates one on the other immediately after cutting of the pasted mesh alternates thick plates with thin plates and, because the plates commonly have tapered pasted mesh cross-sections, compensates for transverse variations in thickness by positioning thin plate side edges over thick plate side edges.

In its broad aspect, the method of the invention comprises merging a single row of plates from two adjacent rows of laterally opposed plates travelling side-by-side on a moving conveyer, inverting plates in one row of plates, sequentially stacking a plate from one of the rows of plates onto the opposed plate in the other row to form a single row of stacked plate pairs, and forming bundles of said plate pairs.

In another aspect of the invention, bundles of vertically stacked plates collected in receptacles are rocked side-to-side on one side edge to align the end edges of the plates, the receptacles with contained plates are rotated vertically through 90° onto an adjacent side edge of the plates, and the bundles then rocked side-to-side to align the side edges of the plates, whereby each bundle of plates is aligned and squared.

More particularly, the method of the invention for collecting plates from two adjacent rows of plates travelling side-by-side on a moving conveyor comprises inverting plates sequentially in one row of plates and merging said two rows of plates by depositing a plate from one row onto a plate in the other row to form a single row of double plates each having an inverted plate, collecting double plates by shingling the double plates to assemble a plurality of overlapped double plates, stacking assembled double plates to form bundles, turning each bundle onto a side or end of the bundle to form a vertically-stacked bundle, and rocking said vertically-stacked bundle on the side or end to align the plates on said side or end, rotating said bundle vertically through 90° onto an adjacent end or side and rocking said bundle on the said adjacent end or side to align the plates on said adjacent end or side, whereby the plates form a squared bundle having even sides and ends.

In a preferred aspect of the invention the plates in the two rows of plates travelling side-by-side initially have tabs extending from opposite side edges and the inversion of one row of plates disposes said tabs on the same side of the two rows of plates, and the plates are deposited sequentially from one row of plates onto the other row of plates whereby the tabs of a pair of plates at least partially overlap each other.

In a most preferred aspect of the invention, the plates are lead alloy battery plates each having a tab extending from a side edge thereof, the two rows of plates are travelling side-by-side on a first conveyor with the tabs of one row of plates facing the tabs of the other row of plates, the plates in one row of plates are inverted by passing the plates sequentially over an endless belt having an upper moving surface turning from a substantially horizontal plane through about 90° to a substantially vertical plane at a linear speed effective to turn the plates upside down onto a collector conveyor, and the two rows of plates are merged by transferring one row of plates onto a diagonal conveyor intersecting the collector conveyor and controlling the relative speeds of the collector conveyor and diagonal conveyor whereby each plate on one conveyor is deposited on a plate of the other conveyor to form a pair of double plates with the tabs of the two plates at least partially overlapping each other. Pairs of double plates are assembled into horizontally-stacked bundles containing a plurality of plates, each bundle is turned onto an end thereof and said bundle is rocked side-to-side for a time sufficient to align the ends of the bundle, said bundle is rotated vertically through 90° onto a side of the bundle whereby the side having the tabs is face upwardly, and said bundle is rocked side-to-side for a time sufficient to align the sides of the bundle, whereby the plates form a squared bundle having even sides and ends with the tabs centered. Each bundle preferably is reversed end-for-end before turning the bundle onto an end for rocking in upwardly open pockets defined by a pair of spaced-apart plates having a closed corner travelling on an endless conveyor.

The apparatus of the invention for collecting two rows of plates travelling side-by-side on a conveyor comprises means for sequentially inverting plates in one row of plates, means for depositing a plate from one row of plates onto a plate in the other row of plates to form a single row of double plates, means for stacking the double plates to form bundles of the double plates, means for rocking each bundle on a side edge of the bundle to align the plates on the said side edge, means for rotating each bundle through 90° onto an adjacent side edge, and means for rocking each said bundle on the said adjacent side edge for aligning the plates on said adjacent side edge for forming a squared bundle of said plates. Preferably, means are provided for shingling said row of double plates to form an assembly of overlapping double plates prior to the means for stacking the double plates to form bundles and means are provided for rotating the bundles through 180° prior to the rocking means.

In a preferred aspect of the invention, means for sequentially inverting the plates in one row of plates comprise an endless inverter belt having a substantially horizontal entry roll at one end and a substantially vertical discharge roll at the opposite end of the belt, to turn the upper surface of the belt about 90° from the horizontal to the vertical, whereby plates in one row of plates fed in succession onto the inverter belt are turned upside down, and an endless collector belt is provided beneath the inverter belt for receiving inverted plates.

The means for depositing a plate from an adjacent row of plates onto an inverted plate comprises a diagonal endless conveyor adapted to travel at an oblique angle to the collector belt beneath the inverter belt for depositing a plate from an adjacent row onto an inverted plate. The means for sequentially inverting the plates in one row of plates preferably additionally comprise a roll for advancing the plates onto the inverter belt, and a vertical guide plate adjacent the vertical roll at the discharge end of the inverter belt for defining a narrow vertical slot to control the inversion of plates and discharge onto the collector belt.

In a preferred apparatus, for collecting plates having tabs on one side thereof, in which at least one of the diagonal belt and the collector belt has speed control means for controlling the placement of plates from the diagonal belt onto plates on the collector belt, whereby the tabs on the plates deposited from the diagonal belt at least partially overlap the tabs on the inverted plates. The means for stacking the double plates to form bundles of the double plates comprise means for shingling the double plates, means for collecting shingled double plates to form bundles of horizontally-stacked plates, and means for collecting and intermittently feeding small bundles of the horizontally-stacked plates to the rocking means. The means for shingling the double plates comprise a shingling conveyor travelling at a speed substantially slower than the collector belt for receiving overlapping double plates, said means for collecting shingled double plates to form bundles comprise a vertically-reciprocal detent roll straddling the shingling conveyor at the discharge end of the shingling conveyor, a vertically-pivotal ramp disposed beneath said shingling conveyor in proximity to the detent roll for raising shingled plates into abutment with said detent roll for collection of a plurality of plates, means for raising and lowering said ramp to collect the plurality of plates for intermittent discharge from the end of the shingling conveyor under the detent roll, and lowering blocks at said discharge end for receiving and accumulating horizontally-stacked plates from the shingling conveyor to form bundles of plates and for lowering said bundles onto an intermittent conveyor for feeding said bundles to the rocking means.

The rocking means for rocking each bundle on adjacent side edges comprises a chain drive, a plurality of equispaced pockets each adapted to receive a horizontally stacked bundle of plates pivotally mounted on said chain drive, means for rocking said pocket with a bundle on an end of the bundle, means for vertically pivoting the pocket with bundle through 90° onto the bottom of the bundle whereby the tabs face upwardly, and means for rocking the pocket with bundle on the bottom of the bundle for aligning edges and the tabs of the plates. More particularly, the rocking means for rocking each bundle on adjacent bottom and side edges comprises a continuous chain drive, a plurality of equispaced pockets each adapted to receive a bundle of horizontally-stacked plates supported by said chain drive, each pocket having a base and box pivotally attached to the base, an elongated plate mounted on each side of the chain drive parallel thereto having a longitudinal sinusoidal recess formed therein, a first follower extending from the base on each side of each pocket into a sinusoidal recess for imparting an undulating side-to-side rocking motion to the pocket and to the bundle of plates therein on their side edges, a second follower extending from the box, and an elevated track defining a recess for receiving the second follower for vertically pivoting the box 90° on the base whereby the plates are pivoted onto their bottom edges for imparting an undulating side-to-side rocking motion to the pocket and to the bundle of plates therein on their bottom edge, whereby the plate tabs and edges are aligned to form squared bundles. Means are also provided for picking squared bundles of plates sequentially from the pockets and for placing said squared bundles of plates into a tray, pusher means for packing said squared bundles of plates in the tray, and reciprocal restrainer means for supporting packed plates in the tray until the tray is fully loaded.

In another preferred aspect of the invention, the product of the invention comprises a vertical stack of metal plates wherein each second metal plate has been inverted, whereby said stack has a uniform, rectangular shape with substantially square ends. The said metal plates preferably are lead alloy battery plate electrodes coated with a paste.

BRIEF DESCRIPTION OF THE DRAWINGS

The method and apparatus of the invention will now be described with reference to the accompanying drawings, in which.

DESCRIPTION OF THE PREFERRED EMBODIMENTS

Figure 1:
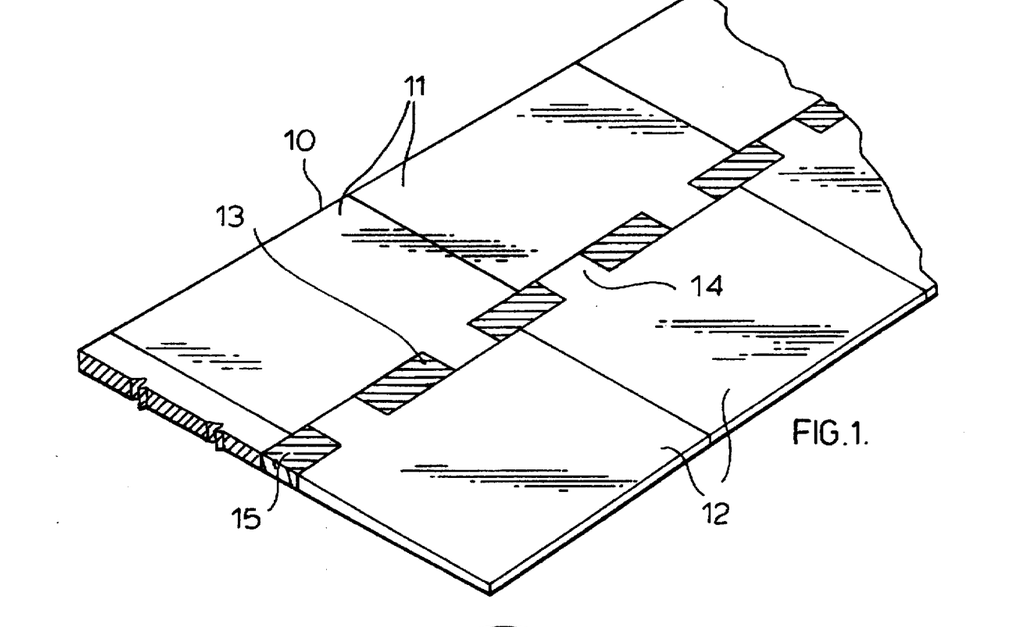
FIG. 1 is a fragmentary perspective view of a strip of cast metal showing plate cut lines and tapered cross-section, exaggerated for purposes of illustration.
Figure 4:
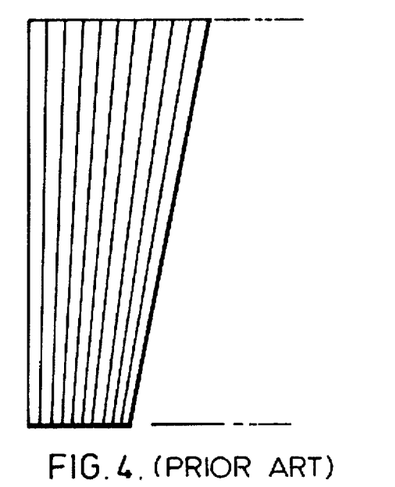
FIG. 4 is an end elevation of a plurality of vertically stacked plates assembled according to the prior art.
Figure 5:
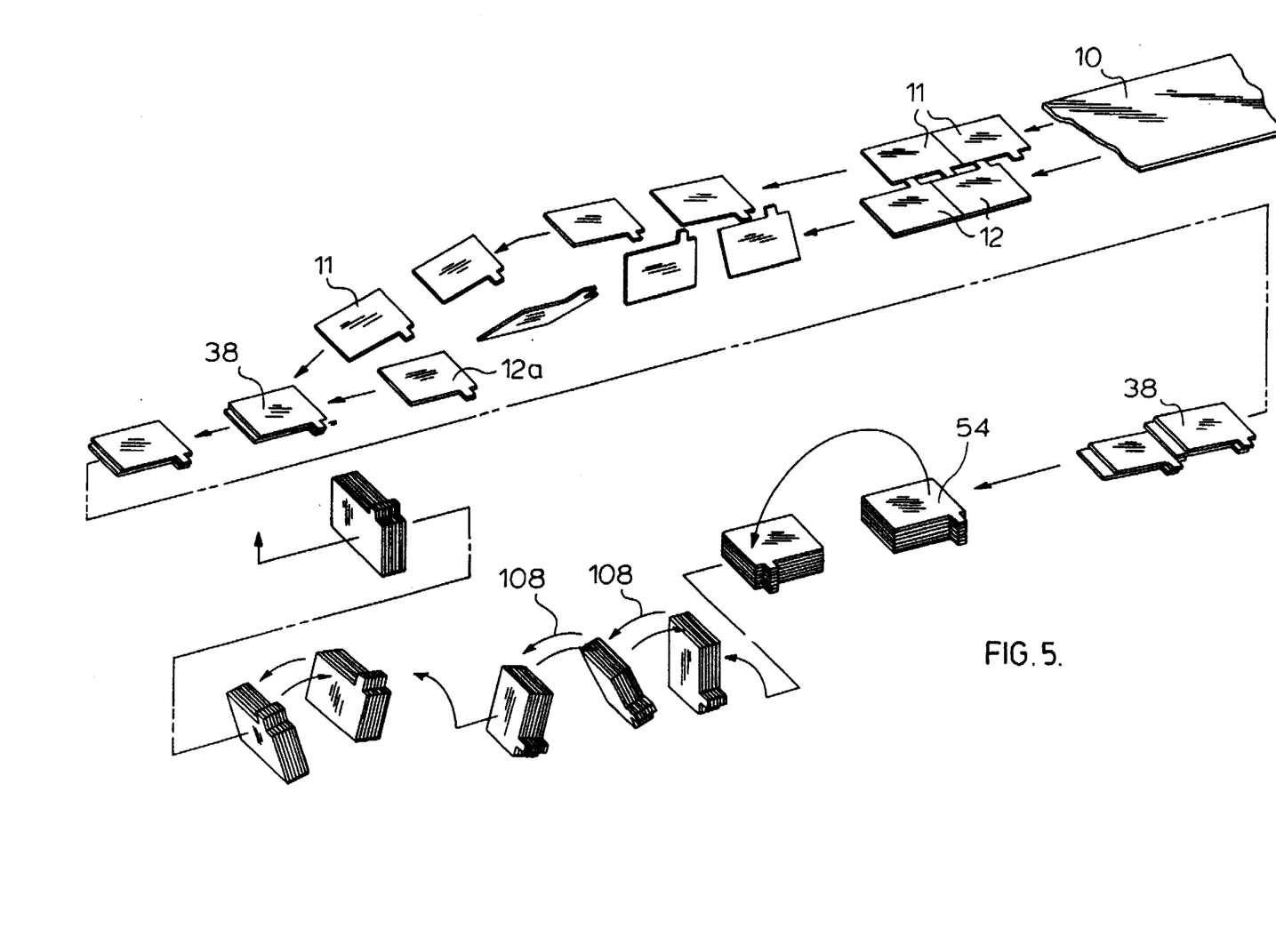
FIG. 5 is a perspective view illustrating schematically the steps of the method of the present invention.
Figure 6:
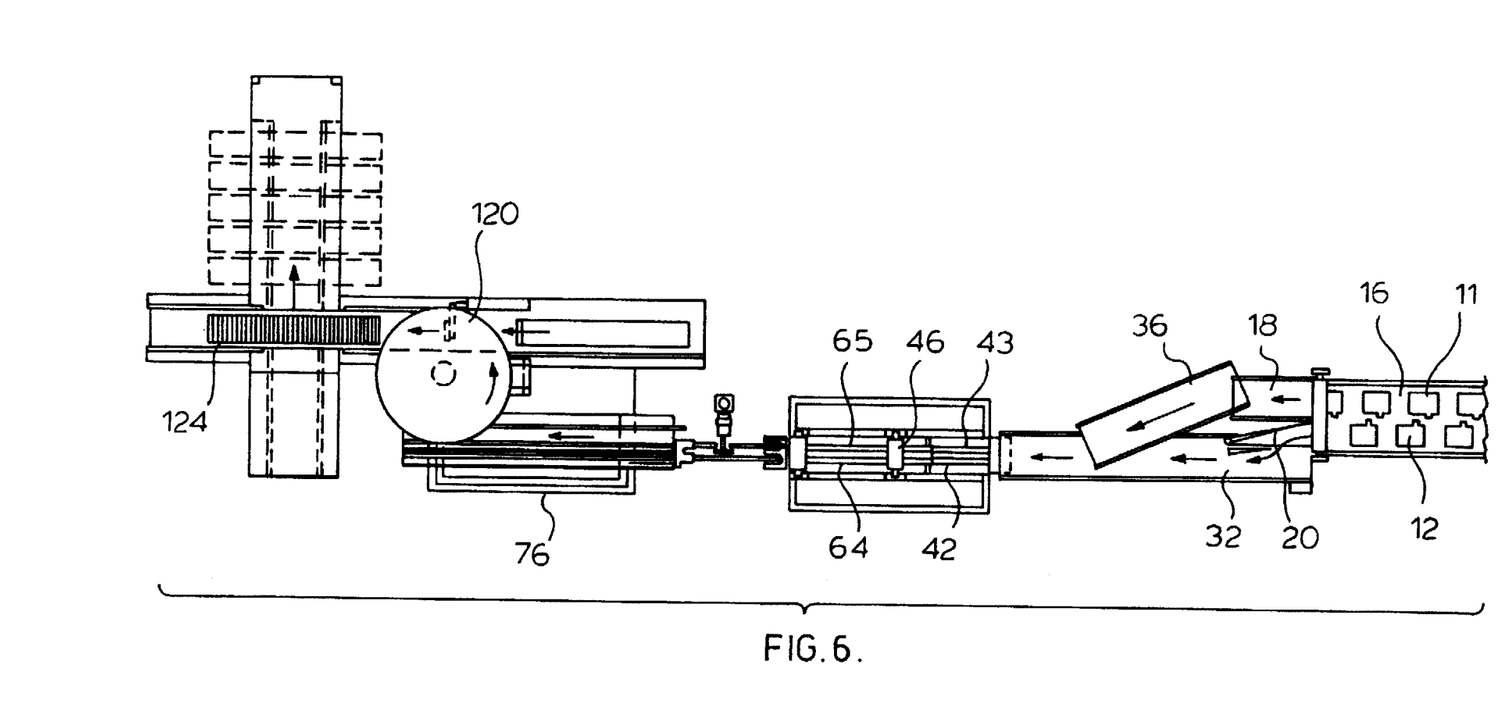
FIG. 6 is a plan view of the apparatus of the invention.

With reference first to FIG. 1, expanded mesh 10 produced from continuously cast strip from a molten metal alloy is shown cut into plates 11, 12 with tabs 13, 14 extending inwardly. The mesh areas designated by numeral 15 are discarded and recycled. Expanded metal strip pasted on one side often does not have a uniform cross-section and typically may have a slightly tapered shape. Turning to FIG. 4, the conventional stacking of tapered plates, according to prior art methods, results in irregularly-shaped vertically stacked plates producing stacks which are not square; in this illustration the top is longer than the bottom.

Figure 2:
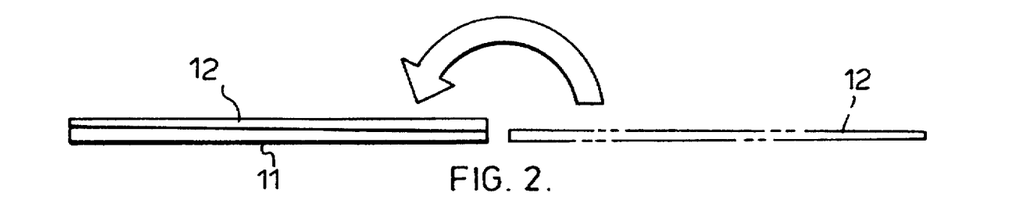
FIG. 2 is an end view of a pair of stacked plates in which an adjacent plate (ghost lines) has been inverted and stacked.
Figure 3:
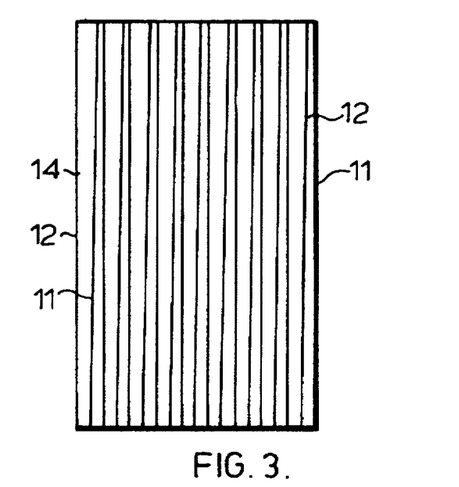
FIG. 3 is an end elevation of a plurality of vertically stacked plates assembled according to the method of the present invention.

The inverting of the plates in one row of plates and stacking of the inverted plates onto adjacent plates in a second row of plates, as illustrated in FIG. 2 which shows pasted plate 12 inverted and stacked on adjacent pasted plate 11, compensates for cross-section taper in the plates and allows production of the vertically-stacked square bundle typified in FIG. 3. The alternating of plates to provide a single merged stack of plates also provides the advantage of compensating for lack of uniformity in the application of paste to battery grid plates, by averaging thick and thin paste coatings over the stack of plates.

Turning now to FIGS. 5–7a, plates 11, 12 uniformly linearly spaced apart and laterally opposed in parallel rows on conveyor 16 are fed onto merger and inverter belts 18 and 20 respectively. Plates 12 are fed sequentially to continuous inverter belt 20 at horizontal entry roll 22, which rotates in the plane of conveyor 16, and are pivoted 90° laterally about lower side edge 24 of plates 12 by forward linear movement of the belt 20 as the plane of belt 20 turns through 90° from the horizontal roll 22 to vertical belt roll 26.

Figures 7, 7A:
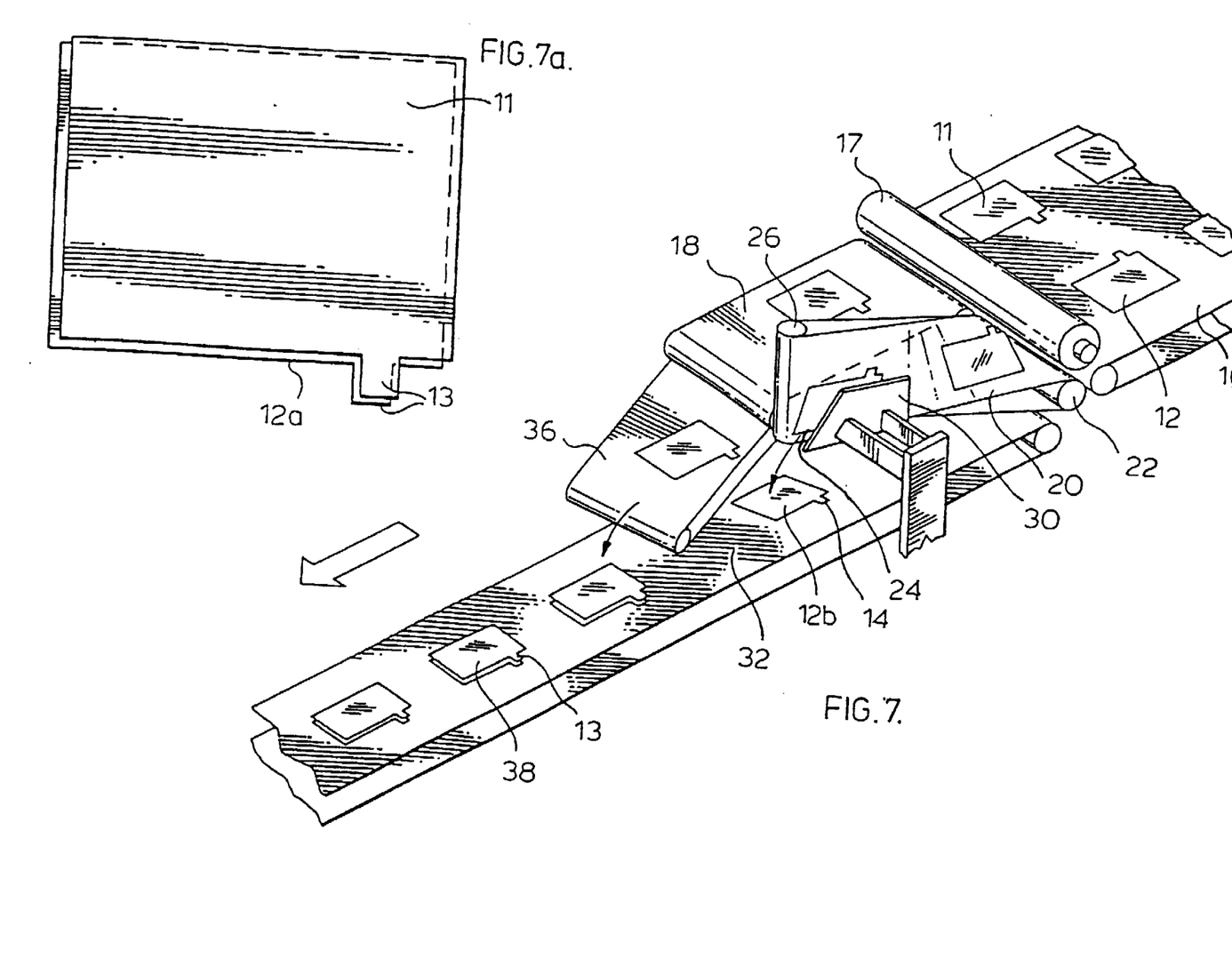
FIG. 7 is a perspective view of an inverting and stacking apparatus of the invention.
FIG. 7a illustrates a pair of stacked plates showing the plate tabs overlapping.

A substantially vertical guide plate 30 suspended adjacent belt 20 at vertical roll 26 defines with belt 20 a narrow vertical slot through which the plates pass, allowing the plates to continue pivoting about plate lower side edge 24 by the forward and rotational momentum imparted to the plates by the linear speed of belt 20 through an additional 90° of rotation for complete inversion of the plates onto continuous collector belt 32 to the inverted position depicted by numeral $12^a$.

Plates 11 in the parallel row on conveyor 16 are sequentially fed first to conveyor belt 18 and then to diagonal conveyor belt 36 travelling at an oblique angle to the direction of travel of belt 18 to convey plates 11 towards belt 32. Plates 11 are discharged from belt 36 onto the mating opposed and inverted plates $12^a$ on collector belt 32 to form stacked pairs 38 which are conveyed to a collecting apparatus, to be described.

The linear speeds of merger belts 18 and 36 are synchronized with the linear speeds of inverter belt 20 and collector belt 32 to enable plates 11 to be deposited onto mating plates $12^a$. The longitudinal alignment of plates 11 is maintained during travel on diagonal merging belt 36 whereby the plates 11 and $12^a$ comprising each stacked pair 38 are aligned with plate tabs 13, 14 substantially coextensive with and overlapping each other, as shown in FIG. $7^a$.

Figures 8, 9, 10:
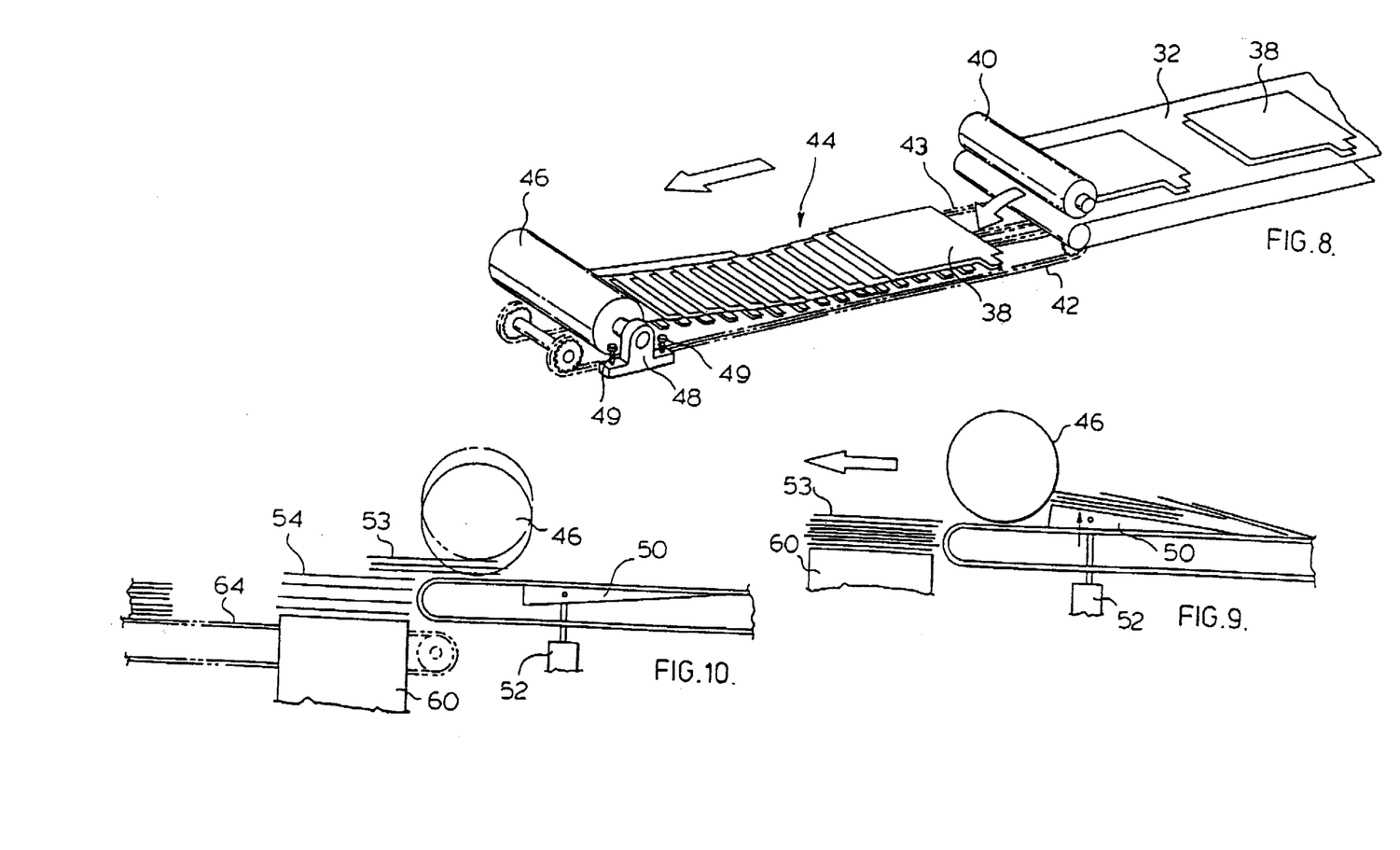
FIG. 8 is a perspective view of an apparatus for collecting shingled plates.
FIG. 9 is a side elevation of the collecting apparatus shown in FIG. 8 with lifting wedge in an extended "up" position.
FIG. 10 is a side elevation of the collecting apparatus shown in FIG. 8 with lifting wedge in a retracted "down" position; allowing collected plates to advance.
Figure 11:
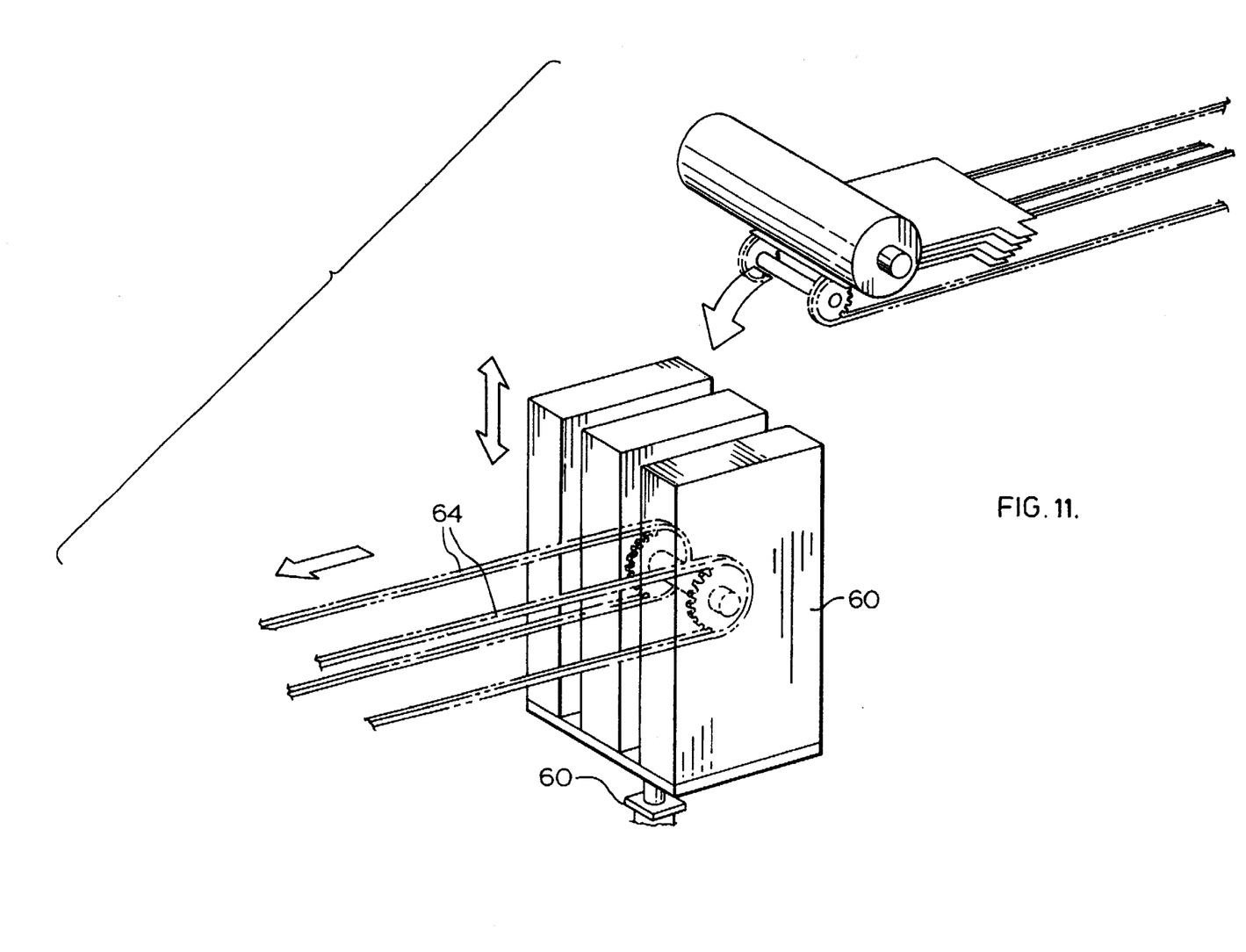
FIG. 11 is a perspective view of lowering blocks for collecting and stacking plates.
Figure 12:
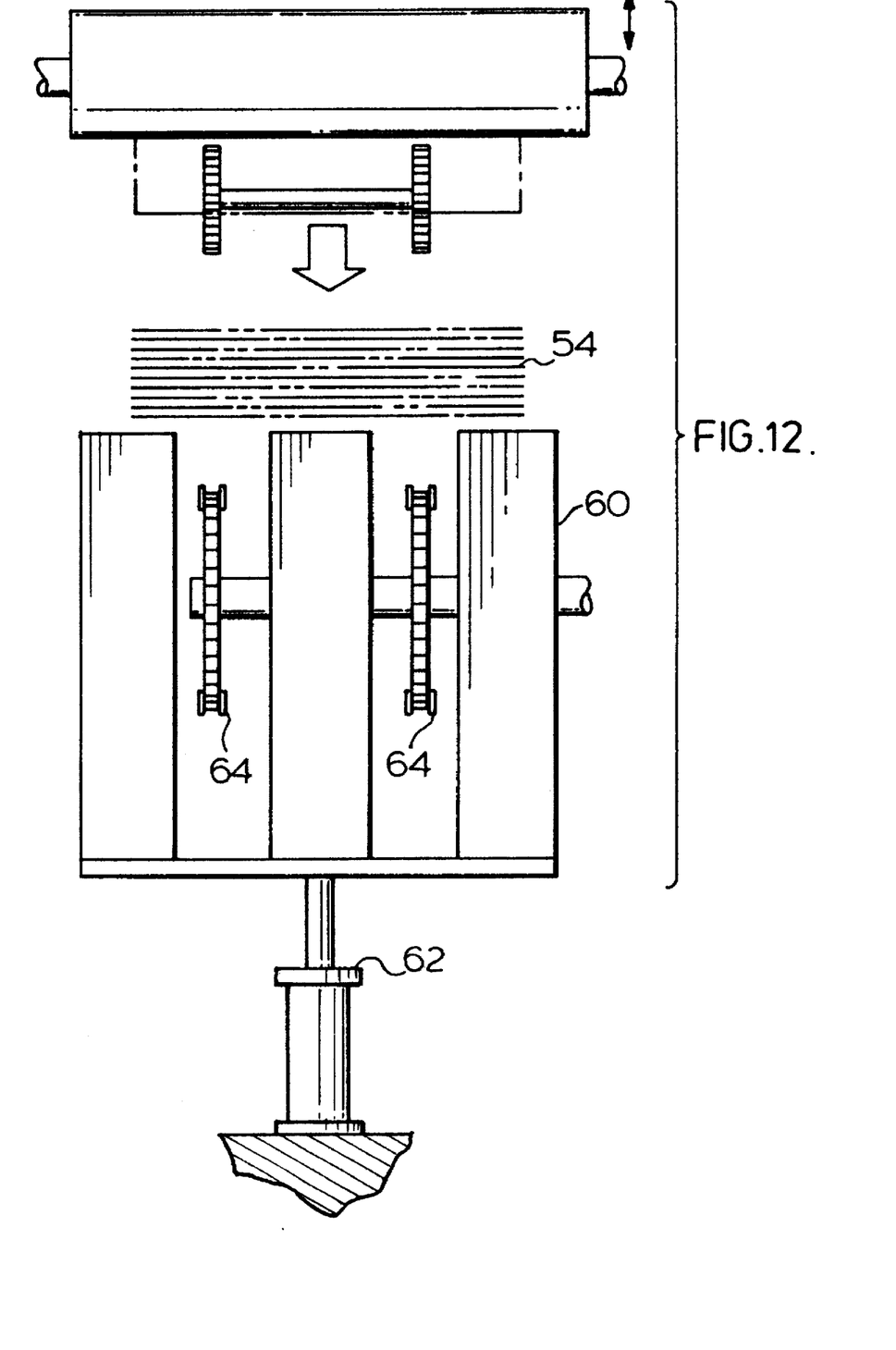
FIG. 12 is a front elevation of the lowering block apparatus shown in FIG. 11.
Figure 13:
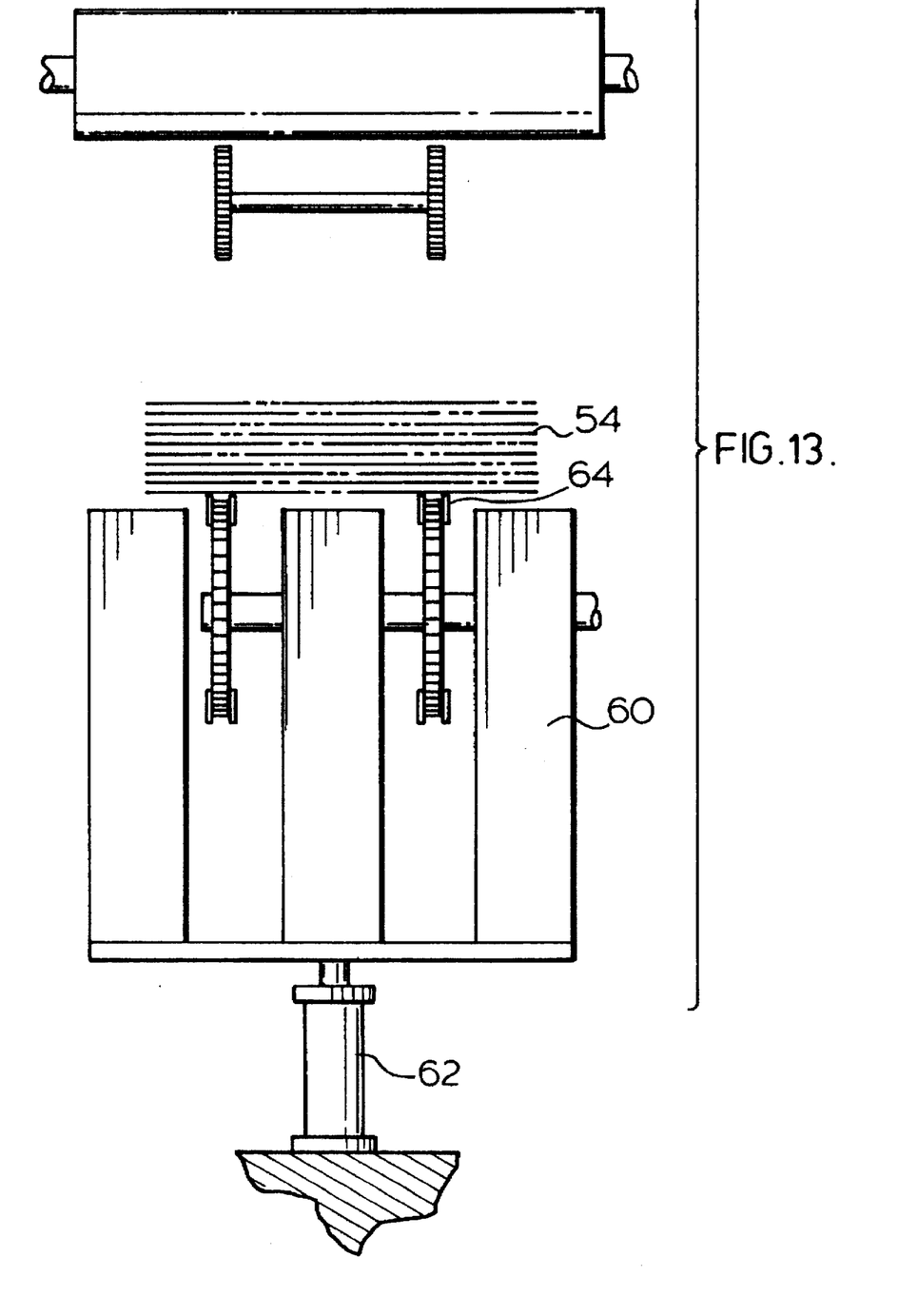
FIG. 13 is a front elevation of the apparatus shown in FIG. 11 fully retracted to advance collected and stacked plates.

With reference now to FIG. 8, the plate pairs 38 can be conveyed along belt 32 at a relatively high speed and discharged under stabilizer roll 40 onto a pair of endless, laterally spaced-apart conveyor chains 42, 43 travelling at a substantially slower speed. Plate pairs 38 are stacked to form a shingled effect, as indicated by numeral 44, and carried to detent roll 46 which is journalled for rotation in vertically-reciprocal blocks 48 which are loosely mounted by bolts 49 for limited vertical travel. A wedge-shaped ramp 50 pivotally mounted between chains 42, 43 is actuated upwardly as depicted in FIG. 9 by pneumatic piston-cylinder assembly 52 to cause a plurality of plate pairs 38 to abut against and collect at detent roll 46. At predetermined timed intervals, a small stack 53 of plates is allowed to pass under roll 46 as ramp 50 is temporarily retracted downwardly, roll 46 being allowed sufficient vertical upward travel as illustrated in FIG. 10 to pass small stack 53. A stack 54 accumulates on lowering blocks 60, which are slowly lowered by pneumatic piston-cylinder assembly 62 as shown more clearly in FIGS. 11–13, until a desired height of stack 54 is attained, at which time complete downward retraction of blocks 60 places stack 54 on intermittently operated endless parallel conveyor chains 64.

Figures 14, 15:
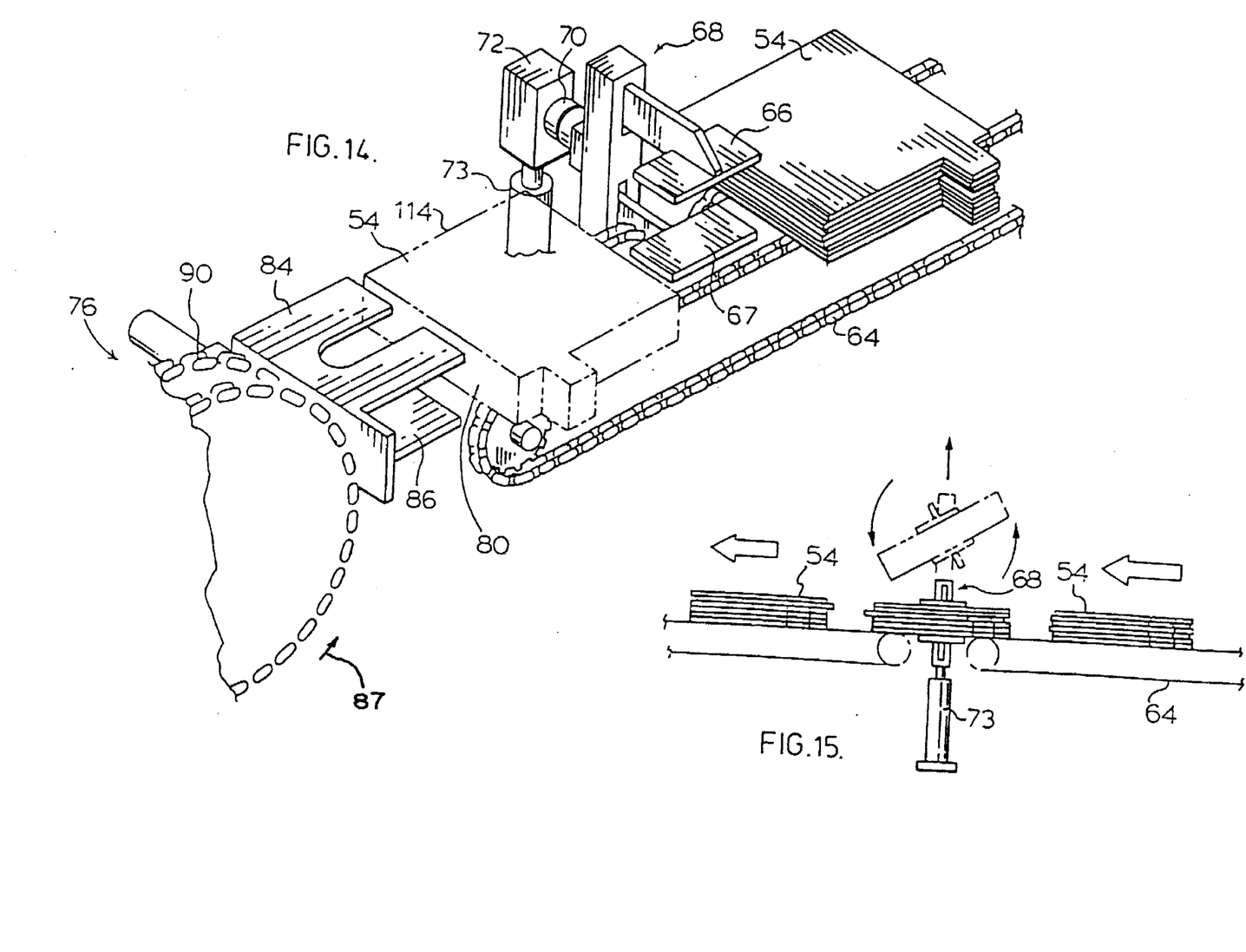
FIG. 14 is a perspective view of an apparatus for turning collected and stacked plates through 180°.
FIG. 15 is a side elevation of the apparatus shown in FIG. 14 schematically illustrating its operation.

With reference now to FIGS. 14 and 15, each horizontal stack 54 is advanced intermittently on chains 64 between the opposed jaws 66, 67 of rotating device 68 which is rotatable about the horizontal axis of shaft 70 supported by vertically-reciprocal drive box 72 on telescoping post 73. Actuation of device 68 closes jaws 66, 67 to engage stack 54, upward extension of post 73 elevates stack 54 as depicted in FIG. 15, and drive 72 is actuated to rotate the stack end-for-end through 180° of rotation such that the trailing edge of the stack becomes the leading edge for reasons which will become apparent as the description proceeds and post 73 is retracted to seat the stack 54 on conveyor 64. Although a rotating device 68 is shown for rotating stack 54 end-for-end vertically about a horizontal axis, it may be preferred to rotate stack 54 end-for-end horizontally about a vertical axis.

Stack 54 now having a relatively square leading edge 80 compared to the initial irregular leading edge is advanced to centering and squaring apparatus 76 shown in FIGS. 6, 14 and 16, 17. Each horizontal stack 54 is delivered into a horizontal pocket or box 82 defined between two spaced-apart plates 84, 86. Pocket 82 is one of a plurality of equispaced pockets carried by parallel endless chains 90. Conveyor chains 90 are driven by a gear drive well known in the art and indexed such that a pocket 82 is temporarily positioned opposite to a stack 54 as the stack is discharged from chains 64, as shown in FIG. 14. Stack 54 loosely fits into pocket 82, preferably occupying about 75% of the pocket capacity, and is cantilevered upwardly by the sides 84, 86 of pocket 82 as chains 90 are advanced in the direction shown by arrow 87 and pocket 82 is rotated to an upright position shown in FIGS. 16 and 17.

Figure 16:
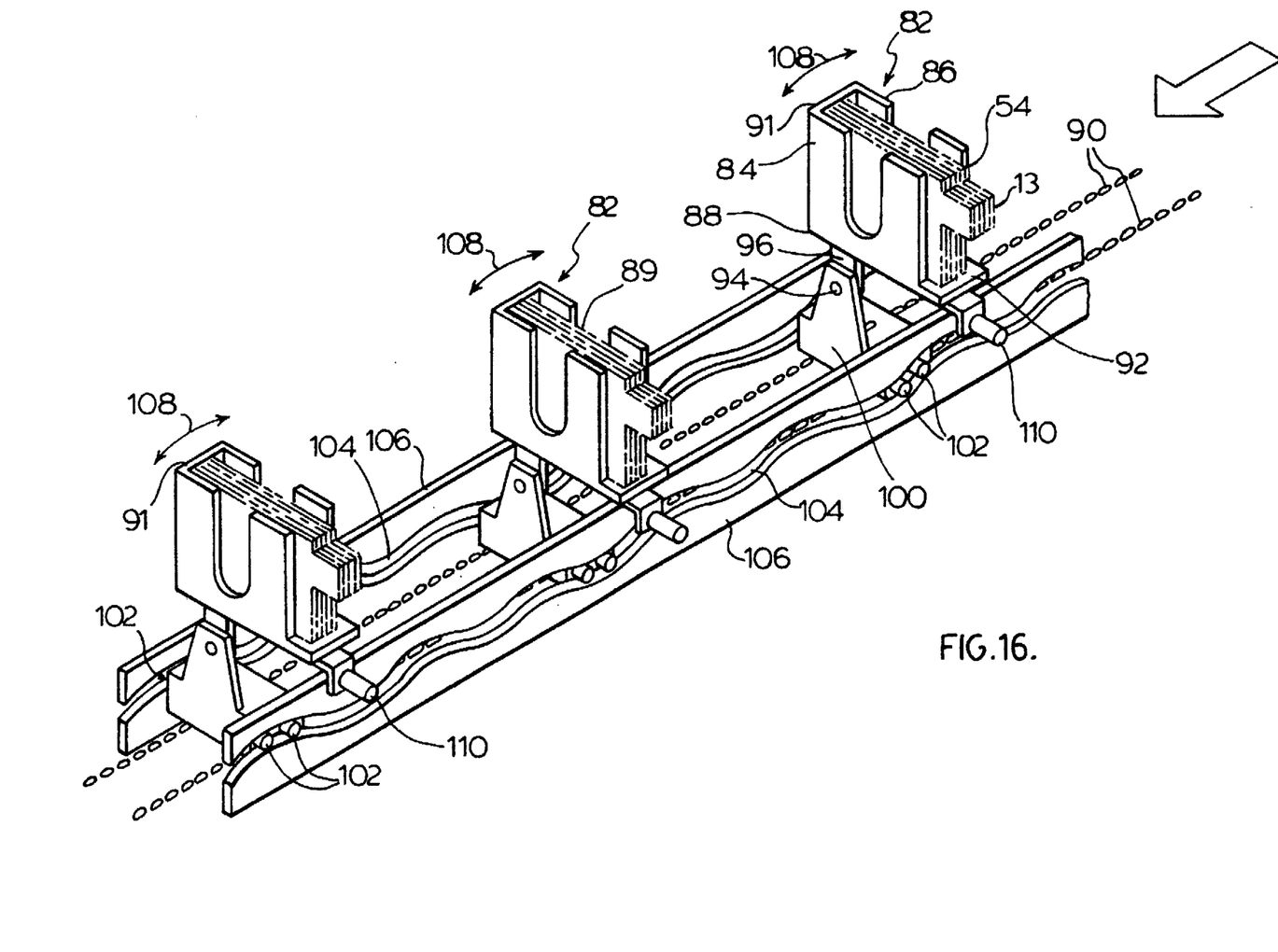
FIG. 16 is a perspective view of the first stage of an edge aligning and centering apparatus of the invention.

With reference now to FIG. 16, pocket 82 has a closed box corner 88 formed by end plate 91 and bottom plate 92 joining sides 84, 86. Each pocket 82 is pivotally-mounted onto parallel chains 90 by a pivot pin 94 joining bottom extension 96 to base 100 attached to chains 90. A pair of guide wheels 102 extending out of the opposite ends of base 100 are adapted to travel in sinusoidal recesses 104 formed in elongated spaced-apart plates 106 to impart a rocking motion to pockets 82 and their vertically-stacked plates as they travel the length of recesses 104 while drawn by chains 90. A gentle side-to-side rocking motion indicated by arrows 108 in FIGS. 5 and 16 imparted to stacks 54 as wheels 102 follow the undulating path of recesses 104 levels the upper edges of stacks 54, i.e. the end edges 89 of the plates.

Pockets 82 are then pivoted vertically upwardly through 90° as follower 110 extending from plate 92 follows the path defined by spaced-apart guide tracks 112 upwardly to the lug position depicted by numeral 112a, to tip box and stack 54 onto its bottom edge 114 (FIG. 14) on pocket end plate 91. A gentle side-to-side rocking motion indicated by arrow 115 is imparted to stack 54 as it travels from lug position 112a to lug position 112b as wheels 102 continue to travel in slots 104. The plates in stack 54 thus are gently rocked side-to-side to level the top edge of stack 54, thereby completing centering and alignment of tabs 13, 14 of the plates in the stack.

A water mist spray 118 preferably is applied to pockets 82 as the pockets begin the return trip to the loading station (FIG. 14) suspended upside down. The water spray washes the pockets to remove and collect harmful lead dust and to lubricate the boxes 82 to minimize friction between the individual plate edges and the boxes thereby facilitating squaring of the plate bundles.

Figure 17:
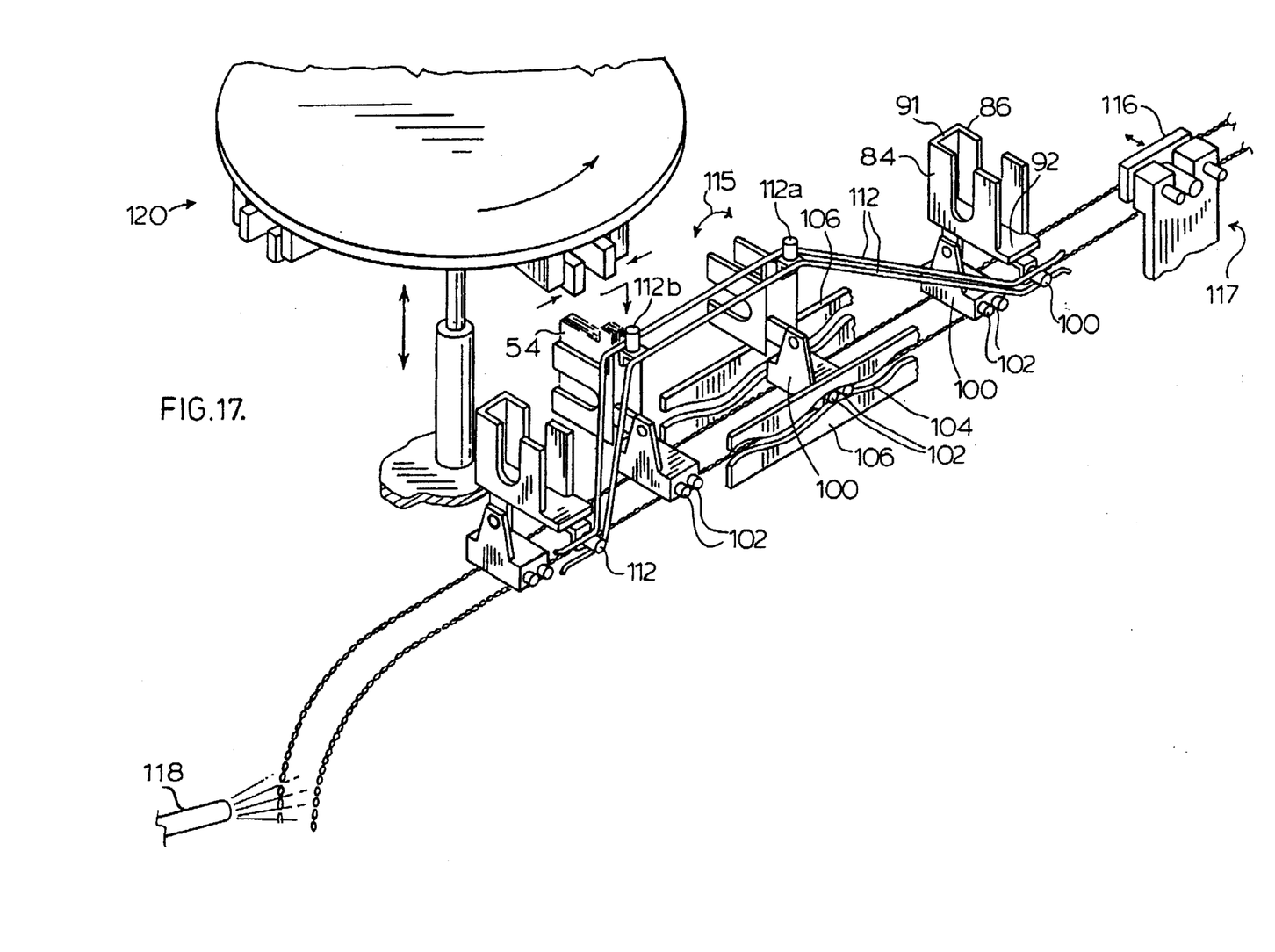
FIG. 17 is a perspective view of a second stage of an edge aligning and centering apparatus with a carousel device.

A pusher plate 116 horizontally reciprocally mounted at 117, normally pneumatically actuated, optionally may be provided to assist aligning of the plate bundles 54 after preliminary rocking as show in FIG. 16 and prior to the final rocking as shown in FIG. 17.

A "pick and place" carousel conveyor 120, of the type disclosed in U.S. Pat. No. 5,102,287 granted Apr. 7, 1992 to Tekmax Inc., picks the vertically upright stack 54 up from pocket 82 at lug position 112b and, with reference now also to FIGS. 6 and 17, rotates the stack 180° to a diametrically opposite position depicted by numeral 122 where the stack 54 is lowered into double-ended tray 124. Each stack 54 is pushed forward by reciprocally-mounted horizontal pusher plate 126 actuated by piston-cylinder assembly 128 against the loaded plate contents 129 of the tray 124. A finger holder 130 reciprocally-mounted by piston-cylinder assembly 131 for horizontal travel abuts and holds the last plate 132 to allow pusher plate 126 to be retracted until the next stack 54 is added, at which time pusher plate 126 is again actuated.

Figure 18:
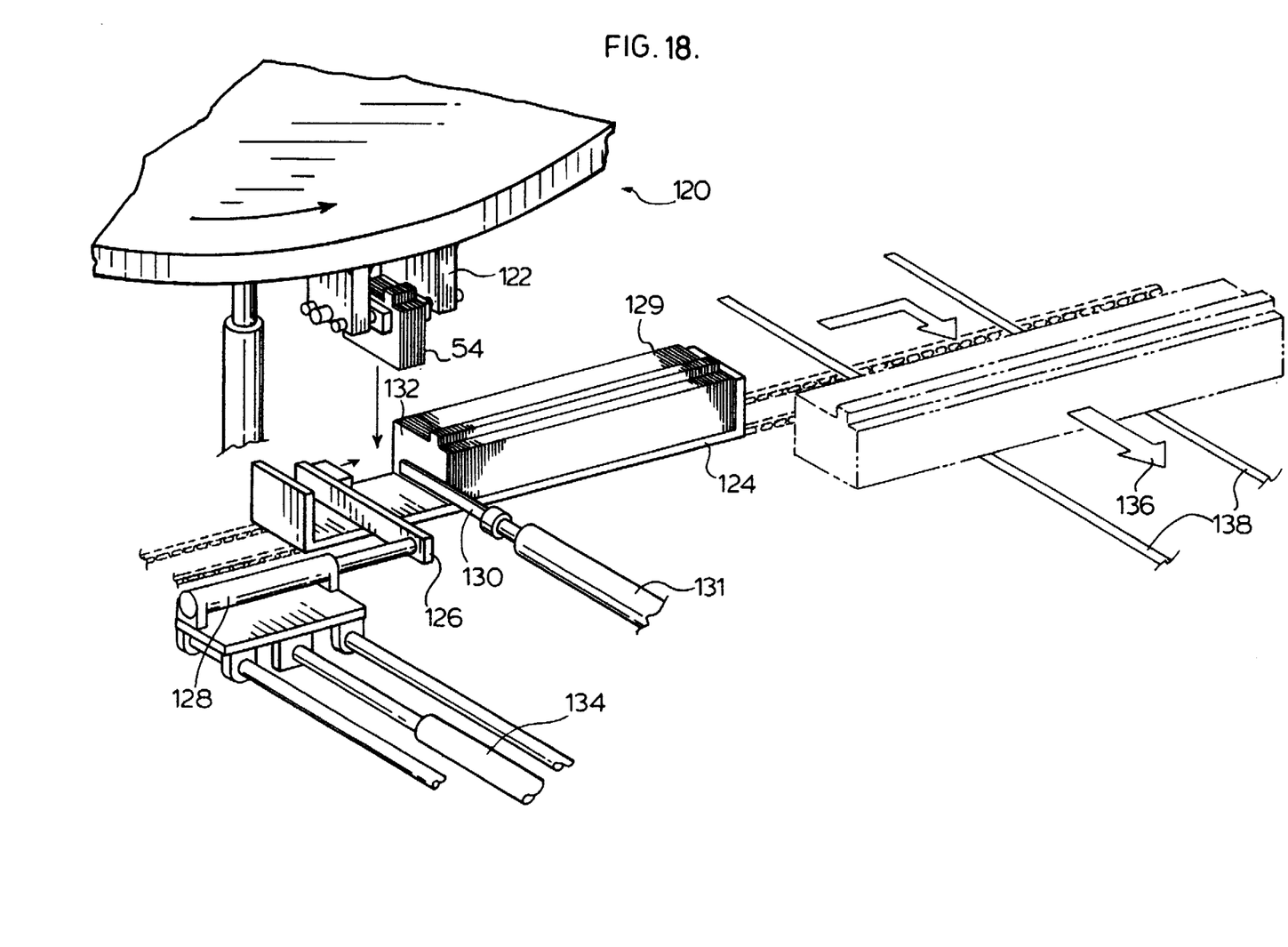
FIG. 18 is a fragmentary perspective view of the carousel device shown in FIG. 17 unloading aligned plates into storage trays.

Pusher plate 126 is withdrawn by piston-cylinder assembly 128 when tray 124 is loaded with vertical stacks of plates advanced to the right as viewed in FIG. 18. The loaded tray is then moved laterally as depicted by arrow 136 on chains 138 for removal.

In operation, metal plates typified by expanded lead alloy battery plate electrodes are fed at a predetermined linear speed such as at 165 feet per minute (fpm) onto inverter belt 20 and parallel belt 18 from conveyor 16, both driven at the same speed by drive roll 22. Plates $12^a$ inverted onto collector belt 32 also travelling at 165 fpm receive plates 11 from merging diagonal belt 36 travelling at an increased speed of about 176 fpm to maintain pace with the speed of the inverted plates $12^a$ on belt 32. The drive mechanisms of either or both of belts 36 and 32 are controlled by variable speed devices well known in the art to allow the relative speed of the merging conveyor belts to be adjusted so that plates 11 will be deposited relatively squarely and coextensively upon inverted plates 12a to form stacked pairs 38 with the respective plate tabs 13, 14 at least partially overlapping to facilitate subsequent alignment and centering of the plates.

The stacked pairs 38 are fed onto shingling conveyor 42 travelling at a significantly reduced speed of about 24 fpm for shingling of the plate pairs 38 and collecting of small horizontal stacks of plates at detent roll 46 by the actuation upwardly of ramp 50 by piston-cylinder assembly 52. The small horizontal stacks 54 are accumulated on lifting blocks 60 by retraction of assembly 52 for passage of plates under roll 46 and forwarded intermittently on chain conveyor 64 at a speed of about 34 fpm to squaring apparatus 76 for side-to-side vertical rocking of the plates first on their end edges and then on their side edges at an average line speed of about 25 fpm for centering and squaring of the plate edges and tabs. It may be preferred to rotate the stacks 54 end-for-end at device 68 to present a more uniform stack leading edge to the squaring apparatus. The squared vertical stacks are then delivered to trays 124 by carousel loader 120, each tray holding a 32–35 inch loaf of plates weighing about 250 pounds. A plurality of loaves normally are cured under controlled humidity and temperature conditions to prepare battery plates for cell assembly.

The present invention provides a number of important advantages. The merging and inverting of alternate plates from two rows of plates to a single row of plates with improved cross-sectional uniformity and squaring of vertical stacks facilitate downstream automated assembly of battery cells by reducing assembly machine downtime for improved productivity rates of up to 20 percent. Uniformity of stack width with alignment of plate tabs minimizes potential damage to battery plates and electrical shorting of cells. Manual handling of plates is substantially obviated, thereby not only reducing potential health problems to workers but also improving quality control.

The amount of lead alloy in battery cell plates is normalized, thereby minimizing over and under forming of the plates during battery formation. Even and uniform formation of the six battery cells in a standard battery promotes extended battery life. A normalized distribution of plate lead alloy among batteries provides a more uniform performance specification with respect to battery reserve capacity. This results in improved lead utilization and a lower battery reject rate. The vertical stacking of battery plates, compared to horizontal stacking, helps the curing process by enhancing air flow due to less tight packing of the battery plates.

It will be understood, of course, that modifications can be made in the embodiments of the invention illustrated and described herein without departing from the scope and purview of the invention as defined by the appended claims.

We claim:

1. A method of collecting plates from two rows of plates travelling side-by-side on a moving conveyor comprising inverting plates sequentially in one row of plates and merging said two rows of plates by depositing a plate from one row onto a plate in the other row to form a single row of shingled double plates each having an inverted plate, stacking shingled double plates to form bundles, turning each bundle onto a side or end of the bundle to form a vertically-stacked bundle, and rocking said vertically-stacked bundle on the side or end to align the plates on said side or end, rotating said bundle vertically through 90° onto an adjacent end or side and rocking said bundle on said adjacent end or side to align the plates on said adjacent end or side, whereby the plates form a squared bundle having even sides and ends.

2. A method as claimed in claim 1, forming bundles of shingled double plates in a stack having a leading side and trailing side, and turning each said bundle through 180° whereby the trailing side becomes the leading side prior to turning the bundle onto a side or end for rocking the bundle.

3. A method as claimed in claim 1, in which the plates in the two rows of plates travelling side-by-side initially have tabs extending from side edges and the inversion of one row of plates disposes said tabs on the same side of the plates in the two rows, and in which the plates are deposited sequentially from one row of plates onto the other row of plates to form a pair of plates whereby the tabs of a pair of plates at least partially overlap each other.

4. A method of collecting lead alloy battery plates each having a tab extending from a side edge thereof, from two rows of plates travelling side-by-side on a first conveyor with the tabs of one row of plates facing the tabs of the other row of plates, inverting the plates in one row of plates by passing the plates sequentially over an endless belt having an upper moving surface turning from a substantially horizontal plane through about 90° to a substantially vertical plane at a linear speed effective to turn the plates upside down onto a second conveyor, merging the two rows of plates by transferring the other row of plates onto a diagonal conveyor intersecting the second conveyor and controlling the relative speeds of the second conveyor and diagonal conveyor whereby each plate from the diagonal conveyor is deposited on a plate on the second conveyor to form a pair of double plates with the tabs of the two plates at least partially overlapping each other, and assembling said double plates into bundles.

5. A method as claimed in claim 4, assembling pairs of plates into horizontally-stacked bundles containing a plurality of plates, turning each bundle onto an end thereof and rocking said bundle side-to-side for a time sufficient to align the ends of the bundle, rotating said bundle vertically through 90° onto a side of the bundle whereby the side having the tabs is facing upwardly, and rocking said bundle side-to-side for a time sufficient to align the sides of the bundle, whereby the plates form a squared bundle having even sides and ends.

6. A method as claimed in claim 5, turning each bundle end-for-end before turning the bundle onto an end for rocking.

7. A method as claimed in claim 5, turning each bundle onto an end thereof by passing the horizontally-stacked bundles into upwardly open pockets defined by a pair of spaced-apart plates having a closed corner travelling on an endless conveyor.

8. A method as claimed in claim 7, picking each rocked and squared bundle out of the pocket, rotating said bundle through 180°, and placing said bundle in a container to form an elongated bundle for heat treatment.

* * * * *